(12) United States Patent
Rashid et al.

(10) Patent No.: US 9,538,431 B2
(45) Date of Patent: Jan. 3, 2017

(54) HANDOVER AT SPECTRUM RELEASE FOR LICENSED SHARED ACCESS

(71) Applicant: Intel Corporation, Santa Clara, CA (US)

(72) Inventors: Mohammad Mamunur Rashid, Hillsboro, OR (US); Satish Chandra Jha, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 14/495,517

(22) Filed: Sep. 24, 2014

(65) Prior Publication Data

US 2016/0088531 A1    Mar. 24, 2016

(51) Int. Cl.
*H04W 36/00* (2009.01)
(52) U.S. Cl.
CPC ................................ *H04W 36/0072* (2013.01)
(58) Field of Classification Search
USPC ...................... 455/432.1, 436–440, 442–453, 455/41.1–41.2, 512–513; 370/328–333
See application file for complete search history.

(56) References Cited

U.S. PATENT DOCUMENTS

| | | | | |
|---|---|---|---|---|
| 2002/0120740 A1* | 8/2002 | Ho | ................... | H04W 74/0816 709/225 |
| 2007/0149206 A1* | 6/2007 | Wang | ................ | H04W 36/0077 455/450 |
| 2012/0087355 A1* | 4/2012 | Wentink | .............. | H04W 74/006 370/338 |
| 2014/0011509 A1 | 1/2014 | Markwart et al. | | |
| 2014/0321425 A1* | 10/2014 | Mueck | ................ | H04W 76/066 370/331 |
| 2014/0357218 A1* | 12/2014 | Andrianov | ............ | H04W 16/14 455/406 |
| 2015/0223069 A1* | 8/2015 | Solondz | ................ | H04W 12/08 370/329 |

(Continued)

FOREIGN PATENT DOCUMENTS

| | | |
|---|---|---|
| WO | WO-2014078676 A2 | 5/2014 |
| WO | WO-2014110161 | 7/2014 |

OTHER PUBLICATIONS

"International Application Serial No. PCT/US2015/048431, International Search Report mailed Dec. 16, 2015", 3 pgs.

(Continued)

*Primary Examiner* — Dai A Phuong
(74) *Attorney, Agent, or Firm* — Schwegman Lundberg & Woessner, P.A.

(57) ABSTRACT

Embodiments of Evolved Node-B (eNBs), user equipment (UE) and methods for licensed shared access (LSA) handover are generally described herein. An eNB includes hardware processing circuitry to receive a command to release spectrum resources in a LSA band over which the eNB serves an LSA cell; to determine whether user equipment (UEs) served by the eNB are permitted to skip a random access process (RAP) to be handed over to a target cell operating on a band separate from the LSA band; and to transmit a message to a UE served by the eNB instructing the UE that the UE is to be handed over to the target cell, the message including one or more indicators based on the determination. Other apparatuses, systems and methods are also disclosed.

19 Claims, 6 Drawing Sheets

(56) References Cited

U.S. PATENT DOCUMENTS

| | | | | |
|---|---|---|---|---|
| 2015/0271866 A1* | 9/2015 | Yamada | .............. | H04W 76/025 |
| | | | | 370/328 |
| 2015/0304853 A1* | 10/2015 | Murray | .............. | H04W 76/068 |
| | | | | 455/454 |
| 2015/0304902 A1* | 10/2015 | Yu | ....................... | H04W 36/165 |
| | | | | 455/436 |
| 2015/0358827 A1* | 12/2015 | Bendlin | ................ | H04W 24/00 |
| | | | | 455/454 |

OTHER PUBLICATIONS

"International Application Serial No. PCT/US2015/048431 Written Opinion mailed Dec. 16, 2015", 6 pgs.

"Motivation for a New SI: RAN support for Licensed Shared Access (LSA)", RP-141353, 3GPP TSG-RAN Meeting #65, Edinburgh, Scotland, (Sep. 2, 2014), 5 pgs.

"New study Item on RAN support for Licensed Shared Access (LSA)", RP-141351, 3GPP TSG-RAN Meeting #65, Edinburgh, Scotland, (Sep. 2, 2014), 6 pgs.

"ETSI System Reference Documents (SRDOCS) Overview", (Feb. 3, 2014), 5 pgs.

"Reconfigurable Radio Systems (RRS); System requirements for operation of Mobile Broadband Systems in the 2 300 MHz-2 400 MHz band under Licensed Shared Access (LSA)", ETSI TS 103 154 V1.1.1, (21 pgs), Oct. 2014.

Khun-Jush, Jamshid, et al., "Licensed shared access as complementary approach to meet spectrum demands: Benefits for next generation cellular systems", ETSI Workshop on Reconfigurable Radio Systems, (Dec. 12, 2012), 7 pgs.

* cited by examiner

HANDOVER AT SPECTRUM RELEASE FOR LICENSED SHARED ACCESS

TECHNICAL FIELD

Examples generally relate to Long Term Evolution (LTE) networks. One or more examples relate to the implementation of Licensed Shared Access (LSA) in LTE networks.

BACKGROUND

Licensed Shared Access (LSA) is a new innovative framework that enables more efficient usage of available spectrum by allowing coordinated shared access to licensed spectrum for addressing spectrum shortage. In the LSA framework, Long Term Evolution (LTE) networks are secondary users of the LSA spectrum owned by an incumbent, and the incumbent can reclaim the LSA spectrum from the LTE network as necessary. Thus, when using the LSA framework, there is a general need for LTE networks to adapt to the dynamic nature of the available spectrum.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Wireless communication systems are widely deployed to provide various types of communication content such as voice, data, and other media. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems. All multiple access wireless communication systems require sufficient access to available radio spectrum for supporting bearer service requirements.

In spite of ongoing innovation to extract greater throughput and data rates from the available spectrum, projected traffic growth indicates that mobile broadband operators will no longer be able to meet demand with their fixed licensed spectrum because the pool of available spectrum for licensing is limited and cannot grow with the increasing demand. Licensed Shared Access (LSA) is a new innovative framework that enables more efficient usage of available spectrum by allowing coordinated shared access to licensed spectrum for addressing spectrum shortage. Currently, a number of LTE compatible spectrum bands (e.g. 100 MHz in 2.3 GHz band, 100+MHz in 2.6 GHz band) are being considered for LSA application. An LSA spectrum sharing framework is strongly backed and urgently awaited by major wireless equipment vendors, operators, regulators, government bodies and standardization bodies.

In the LSA framework an incumbent user shares coordinated access to an unused portion of its licensed spectrum with a group of secondary spectrum holders. The incumbent however retains exclusive right to the spectrum and can reclaim the spectrum from secondary spectrum holders. When using the LSA framework to acquire supplemental spectrum, LTE networks are required to adapt to the dynamic nature of the available spectrum by gracefully accommodating spectrum reclamations by incumbents.

Figure 1:
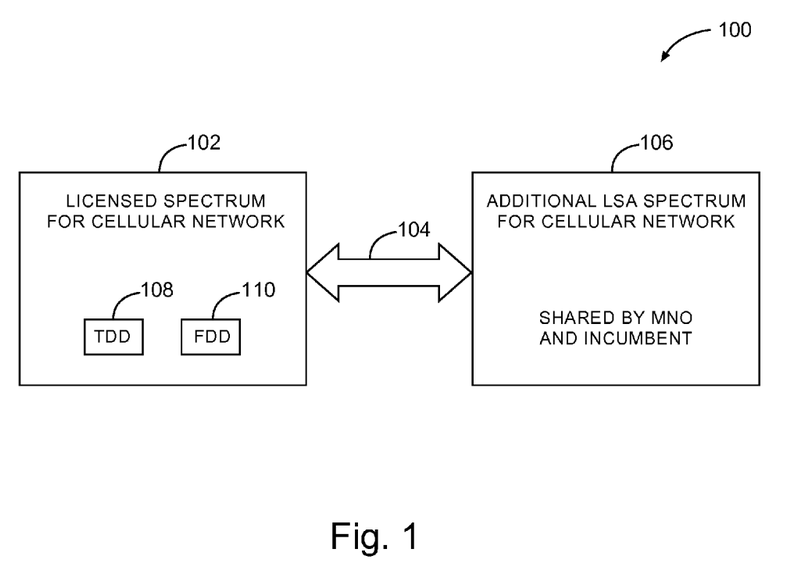
FIG. 1 is a block diagram illustrating dynamic frequency sharing in a cellular network in accordance with some embodiments.

FIG. 1 is a block diagram illustrating dynamic frequency sharing in a cellular network in accordance with some embodiments. A system 100 includes a primary (legacy) LTE band 102 receiving spectrum from or returning spectrum to, at arrow 104, additional LSA frequency band 106. The primary LTE band 102 may include a Time Division Duplexing (TDD) band 108 or a Frequency Division Duplexing (FDD) band 110. The additional spectrum from the additional LSA frequency band 106 may also be TDD or FDD bands.

Figure 2:
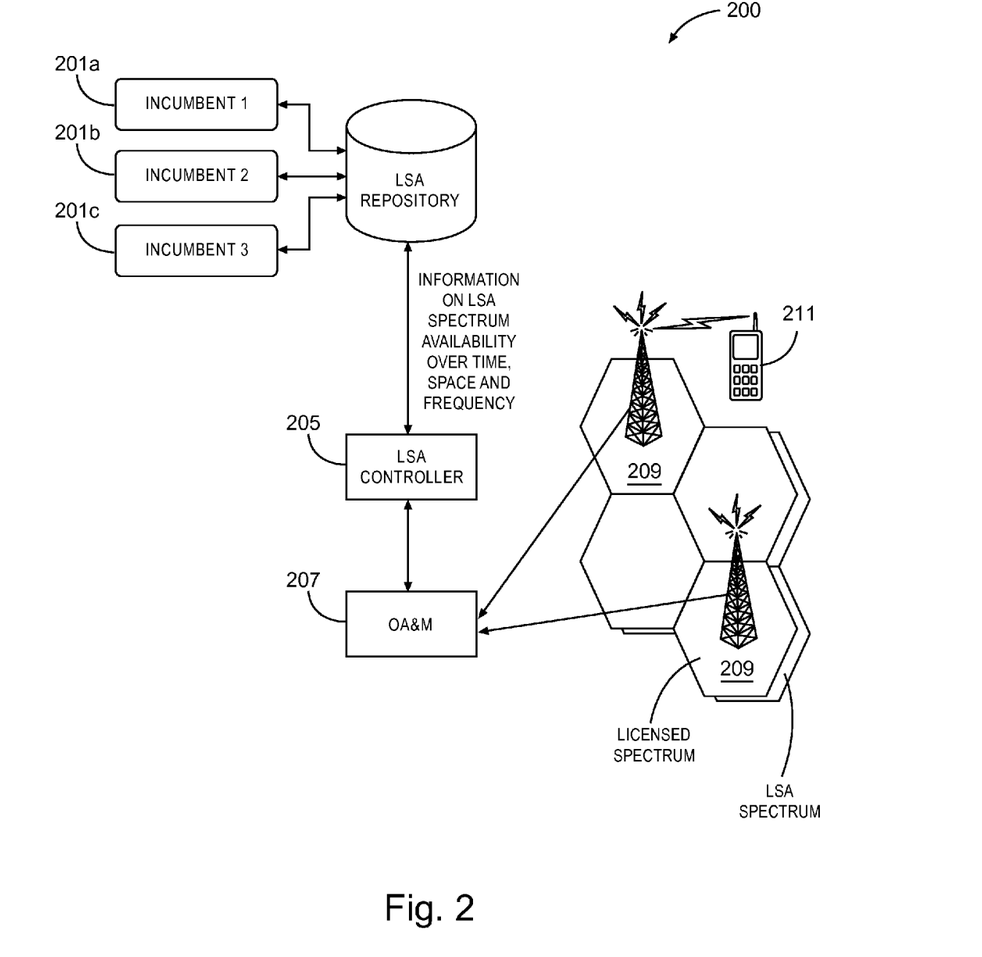
FIG. 2 illustrates a system in which some embodiments are implemented.

FIG. 2 illustrates a system 200 in which some embodiments are implemented. In the system 200, incumbents 201a-c are original spectrum owners. An LSA Repository 203 is a data base containing information on spectrum availability and shorter term aspects of spectrum sharing. The LSA Repository 203 is communicatively coupled to an LSA controller 205, which performs information management and translates LSA Repository 203 data base contents into spectrum access conditions for LSA frequency licensees, while an Operator Administration and Management (OA&M) 207 provides operations, administration, and management for the network operator's network. The OA&M 207 manages limited short term additional spectrum for the network operator's Evolved Node Bs (eNBs), or base stations, 209 serving User Equipment(s) 211.

An LTE eNB 209 releases the LSA band once it is notified of an upcoming reclamation by the incumbent. The eNB 209 completes steps for the spectrum release within, for example, a given time period, by handing over UEs 211 that are connected to their eNBs 209 through the LSA band to the LTE operator's primary LTE band. This handover process can involve potentially hundreds of UEs 211 that need to go through an intra-eNB inter-frequency handover process from the LSA band to the primary LTE band.

The handover process can include a random access procedure (RAP). When the UE 211 re-enters the primary LTE band, the UE 211 needs to synchronize to each frequency and notify the eNB 209 or 209 that the UE 211 is trying to get access. In some cases, the UE 211 will use RAP to get this access by selecting one of several available random access channel (RACH) preambles that includes a particular pattern or signature and transmitting this preamble to the eNB. Occasionally, there will be no available RACH preamble due to the large number of UEs being handed over, or other factors such as high interference levels and power requirements can complicate the RAP. Accordingly, selecting and using RACH preambles and RAP can be error-prone or time consuming.

In some cases, eNBs 209 can provide a dedicated preamble to expedite the handover process. However, only a limited number of dedicated preambles are available for use, which is not sufficient to meet the needs of UEs 211 in LSA scenarios in which hundreds of UEs 211 are handed over simultaneously. Accordingly, a large number of the UEs 211 being handed over will still need to go through RAP to get access to the target eNB 209, causing a large spike in over-the-air signaling, reductions in quality of service, etc. Other UEs 211 in need of other types of handover not related to LSA spectrum release will also experience reduced quality of service due to the unavailability of dedicated preambles.

To address these and other concerns, embodiments provide a faster, less computationally-expensive intra-eNB inter-frequency handover process for LSA that does not rely on RAP by taking advantage of situations in which the physical cells on the LSA band 106 and the primary LTE band 102 are collocated in the same eNB 209. When the physical cells are collocated, the UE 211 is the same distance from both physical cells. Therefore, the frames in these two cells can be synchronized and as such the timing advance will be the same for any UE 211 in both these cells. Thus, UEs 211 can skip RAP in some situations in which the LTE and LSA physical cells are collocated.

Embodiments provide an enhancement to the RRC message format for handover commands so that the eNB 209 can indicate to the UEs 211 that the RAP should be skipped. In some embodiments, the eNB 209 can include uplink grants for the UE within this handover message or another associated message.

Figure 3:
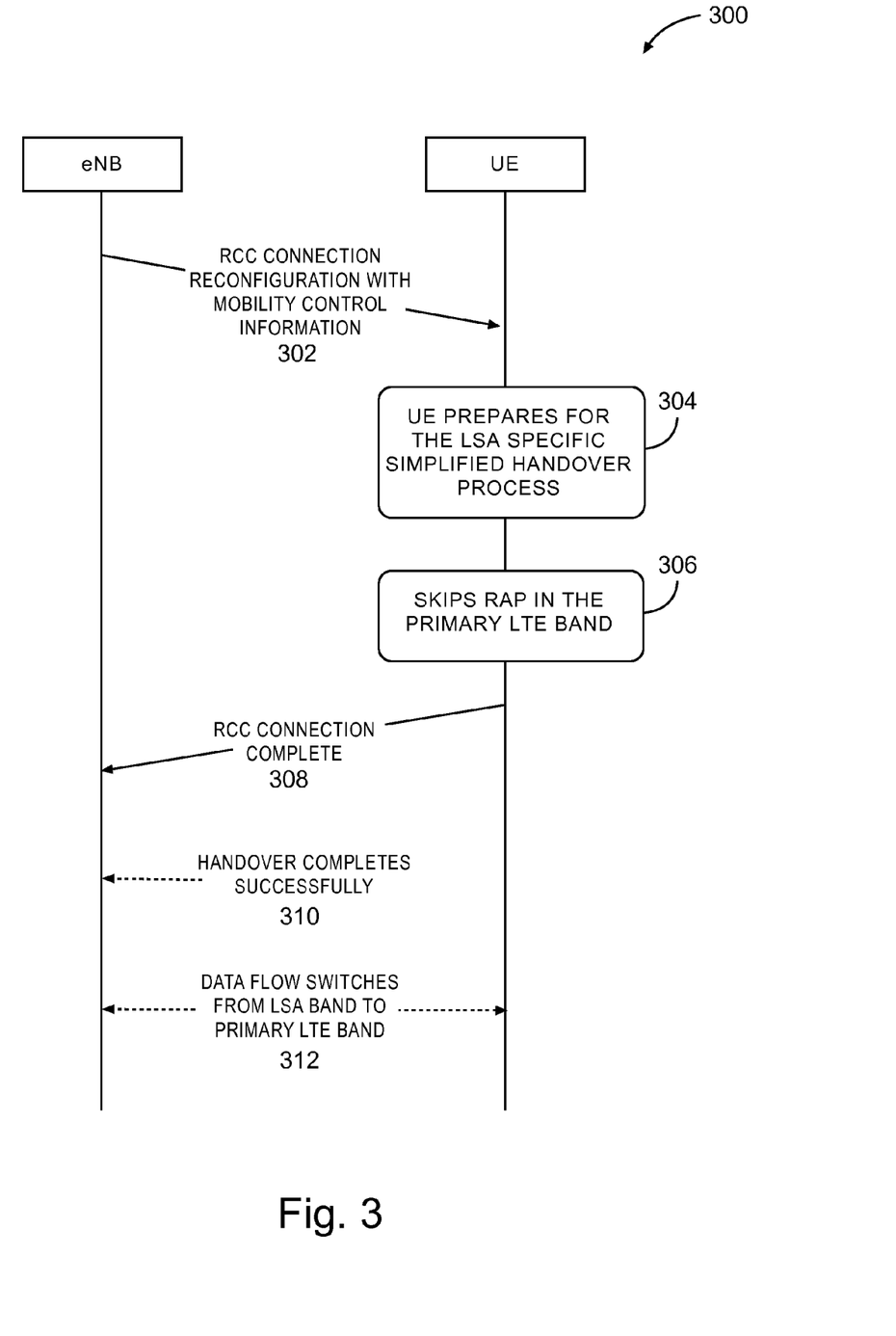
FIG. 3 illustrates signaling for handovers related to LSA spectrum release in accordance with some embodiments.

FIG. 3 illustrates signaling for handovers related to LSA spectrum release in accordance with some embodiments. FIG. 3 is discussed with reference to various entities described with reference to FIGS. 1 and 2.

In accordance with embodiments, the eNB 209 comprises hardware processing circuitry to initiate the handover process when the eNB 209 receives a command to release spectrum resources in an LSA band over which the eNB serves an LSA cell. This command can be received from an LSA controller 205 (FIG. 2), for example.

The eNB 209 then determines whether a UE 211 served by the eNB 209 is permitted to skip RAP to be handed over to a target cell operating on a band separate from the LSA band. This determination can be based on whether the eNB 209 includes the target cell, collocated with the LSA cell, such that frames of the target cell and the LSA cell are synchronized. As mentioned earlier, in some examples, the eNB 209 may serve the target cell in accordance with a standard of the 3GPP Long-Term Evolution (LTE) family of standards, although embodiments are not limited thereto.

Depending on the result of this determination, the eNB 209 may transmit a message 302, for example, an RRCConnectionReconfiguration message, to the UE 211 instructing the UE 211 that the UE 211 is to be handed over to the target cell. The message 302 can include mobility control information by providing, for example, one or more indicators within a mobilityControlInfo information element (IE). The eNB 209 may transmit message 302 over the LSA band to the UE 211 to instruct the UE 211 to move to the primary LTE band. In some embodiments, the RRCConnectionReconfiguration message includes an indication that the RAP is not necessary and will not be executed. In some embodiments, the eNB 209 may provide, at the eNB's 209 discretion, a dedicated preamble for accessing the target cell if the eNB 209 determined that the UE 211 is not permitted to skip the RAP. For example, the eNB 209 may provide a dedicated preamble when the LSA band is deployed on a remote radio head that has a different timing advance than the cell on the primary LTE band.

In some embodiments, the UE 211 will include at least a processor and transceiver, described in more detail later herein with respect to FIG. 4, to receive the RRCConnectionReconfiguration message on the LSA frequency band. In operation 304, the UE 211 prepares for a simplified LSA handover process without using the RAP. The handover process in accordance with embodiments allows the UE 211 to use the timing advance with the LSA cell for accessing the target cell as well. In some currently-implemented handover processes in accordance with 3GPP LTE standards, the timing advance is determined through the RAP in the target cell. The target cell responds to random access requests with uplink (UL) grant information that the UE can use to transmit RRCConnectionReconfigurationComplete message. In contrast, in some embodiments, the RAP is to be skipped, and therefore the eNB 209 will include UL grant information in, for example, the mobilityControlInfo IE in the RRCConnectionReconfiguration message. An example mobilityControlInfo IE is shown in Table 1, although embodiments are not limited to any particular names for fields of the mobilityControlInfo IE, and some embodiments can include more or fewer fields than those shown below:

TABLE 1

Example MobilityControlInfo information element.

```
-- ASN1START
MobilityControlInfo ::= SEQUENCE {
targetPhysCellId              PhysCellId,
carrierFreq        CarrierFreqEUTRA OPTIONAL,      -- Cond HO-toEUTRA2
carrierBandwidth   CarrierBandwidthEUTRA     OPTIONAL, -- Cond HO-toEUTRA
additionalSpectrumEmission   AdditionalSpectrumEmission  OPTIONAL,    -- Cond HO-
toEUTRA
t304      ENUMERATED {ms50, ms100, ms150, ms200, ms500, ms1000, ms2000, spare1},
newUE-Identity                                        C-RNTI,
radioResourceConfigCommon                 RadioResourceConfigCommon,
rach-ConfigDedicated      RACH-ConfigDedicated      OPTIONAL,      -- Need OP
rach-Skipped              ENUMERATED {true}         OPTIONAL, --Cond HO-LSA
ul-Grant                  BIT STRING (SIZE(20))  OPTIONAL, --Cond HO-LSA
```

TABLE 1-continued

Example MobilityControlInfo information element.

```
    ...,
[[    carrierFreq-v9e0    CarrierFreqEUTRA-v9e0    OPTIONAL    -- Need ON
]],
[[drb-ContinueROHC-r11    ENUMERATED {true}    OPTIONAL-- Cond HO
]]
}
CarrierBandwidthEUTRA ::=    SEQUENCE {
    dl-Bandwidth    ENUMERATED {n6, n15, n25, n50, n75, n100, spare10,
                        spare9, spare8, spare7, spare6, spare5,
                        spare4, spare3, spare2, spare1},
    ul-Bandwidth    ENUMERATED {n6, n15, n25, n50, n75, n100, spare10,
                        spare9, spare8, spare7, spare6, spare5,
                        spare4, spare3, spare2, spare1}OPTIONAL -- Need OP
}
CarrierFreqEUTRA ::=    SEQUENCE {
    dl-CarrierFreq        ARFCN-ValueEUTRA,
    ul-CarrierFreq    ARFCN-ValueEUTRA    OPTIONAL    -- Cond FDD
}
CarrierFreqEUTRA-v9e0 ::=    SEQUENCE {
    dl-CarrierFreq-v9e0        ARFCN-ValueEUTRA-r9,
    ul-CarrierFreq-v9e0        ARFCN-ValueEUTRA-r9
        OPTIONAL    -- Cond FDD
}
-- ASN1STOP
```

The rach-Skipped field listed in Table 1 signifies that the RAP should be skipped in the handover process. The ul-Grant field includes the bit string containing UL grant information. Other fields can also be included, for example other fields can be included to indicate that the LSA cell and the cell on the primary LTE band are both co-located in the eNB 209. The eNB 209 is able to provide this uplink grant information because the same eNB 209 is also operating the target cell and therefore the eNB 209 has access to uplink information for the target cell.

In operation 306, after receiving the directive described above with reference to message 302 for a simplified handover, the UE 211 will skip the RAP and will use the uplink grant information received through the RRC message 302 to transmit message 308 to the eNB 209. Message 308 can include, for example, an RRCConnectionReconfiguration-Complete message.

The UE 211 transmits the handover completion message over the primary LTE band and the UE 211 uses the same timing advance as the UE 211 was using with the cell on the LSA band. Accordingly, in operation 310, the eNB 209 receives, from the UE 211 and on the uplink on a resource configured in accordance with the uplink grant information, a confirmation to the message that indicates that the handover process has been completed successfully and that the UE 211 has been successfully handed over to the target cell. Data flow switches from the LSA band to the primary LTE band in signaling 312. The process of switching the data radio bearers to the target cell as part of the handover process remains unchanged from current handover processes. After data flow switches, the eNB 209 may continue to monitor conditions on the LSA band to determine whether spectrum resources on the LSA band can again be utilized.

Figure 4:
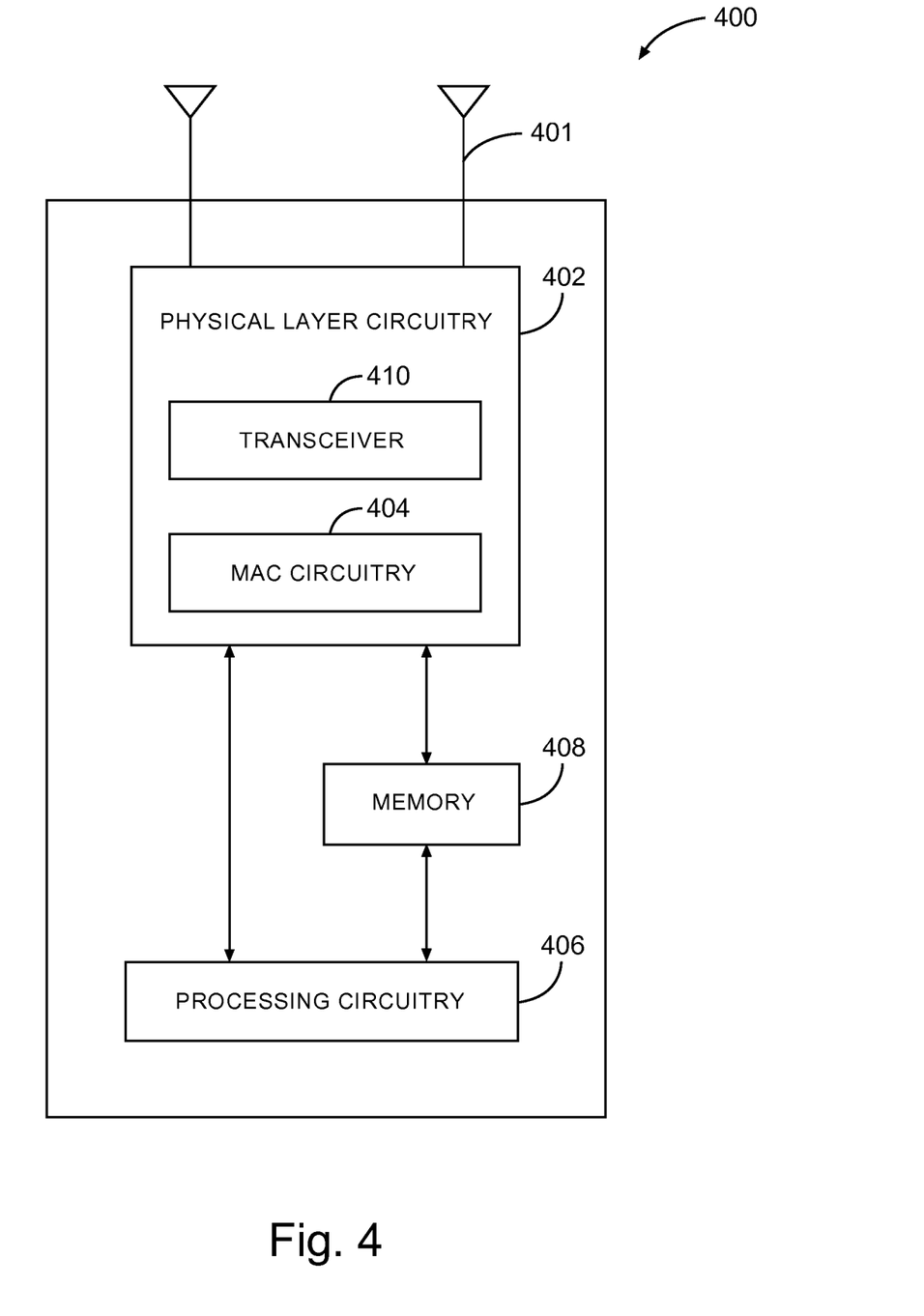
FIG. 4 is a schematic of a communication station according to some embodiments.

FIG. 4 shows a functional diagram of an exemplary communication station 400 in accordance with some embodiments. In one embodiment, FIG. 4 illustrates a functional block diagram of a communication station 400 that may be suitable for use as an eNB 209 or UE 211 (FIG. 2) in accordance with some embodiments. The communication station 400 may also be suitable for use as a handheld device, mobile device, cellular telephone, smartphone, tablet, netbook, wireless terminal, laptop computer, femtocell, High Data Rate (HDR) subscriber station, access point, access terminal, or other personal communication system (PCS) device. It should be noted that when the communication station 400 acts as an eNB 209, the communication station 400 may be stationary and non-mobile.

The communication station 400 may include physical layer circuitry 402 having a transceiver 410 for transmitting and receiving signals to and from other communication stations using one or more antennas 401. The physical layer circuitry 402 may also comprise medium access control (MAC) circuitry 404 for controlling access to the wireless medium. The communication station 400 may also include processing circuitry 406 and memory 408 arranged to perform the operations described herein. In some embodiments, the physical layer circuitry 402 and the processing circuitry 406 may be configured to perform operations detailed in FIGS. 3 and 6.

In accordance with some embodiments, the MAC circuitry 404 may be arranged to contend for a wireless medium and configure frames or packets for communicating over the wireless medium and the physical layer circuitry 402 may be arranged to transmit and receive signals. The physical layer circuitry 402 may include circuitry for modulation/demodulation, upconversion/downconversion, filtering, amplification, etc.

In some embodiments, the processing circuitry 406 of the communication station 400 may include one or more processors. In some embodiments, two or more antennas 401 may be coupled to the physical layer circuitry 402 arranged for transmitting and receiving signals. The memory 408 may store information for configuring the processing circuitry 406 to perform operations for configuring and transmitting message frames and performing the various operations described herein. The memory 408 may comprise any type of memory, including non-transitory memory, for storing information in a form readable by a machine (e.g., a computer). For example, the memory 408 may comprise a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly.

The antennas 401 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

In some embodiments, the communication station 400 may include one or more processors and may be configured with instructions stored on a computer-readable storage device. When the communication station 400 serves as a UE 211 (FIG. 2), the instructions may cause the UE 211 to receive an RRCConnectionReconfiguration message in a Licensed Shared Access (LSA) frequency band instructing the UE 211 to move to a target Long Term Evolution (LTE) frequency band from the LSA frequency band. As described earlier herein, the message may include information indicating that the UE 211 is permitted to skip a RAP to access the LTE frequency band, and the message may further include uplink grant information. When the communication station 400 serves as an eNB 209 (FIG. 2), the instructions will cause the eNB 209 to receive a command to release spectrum resources in an LSA band over which the eNB 209 serves an LSA cell.

Figure 5:
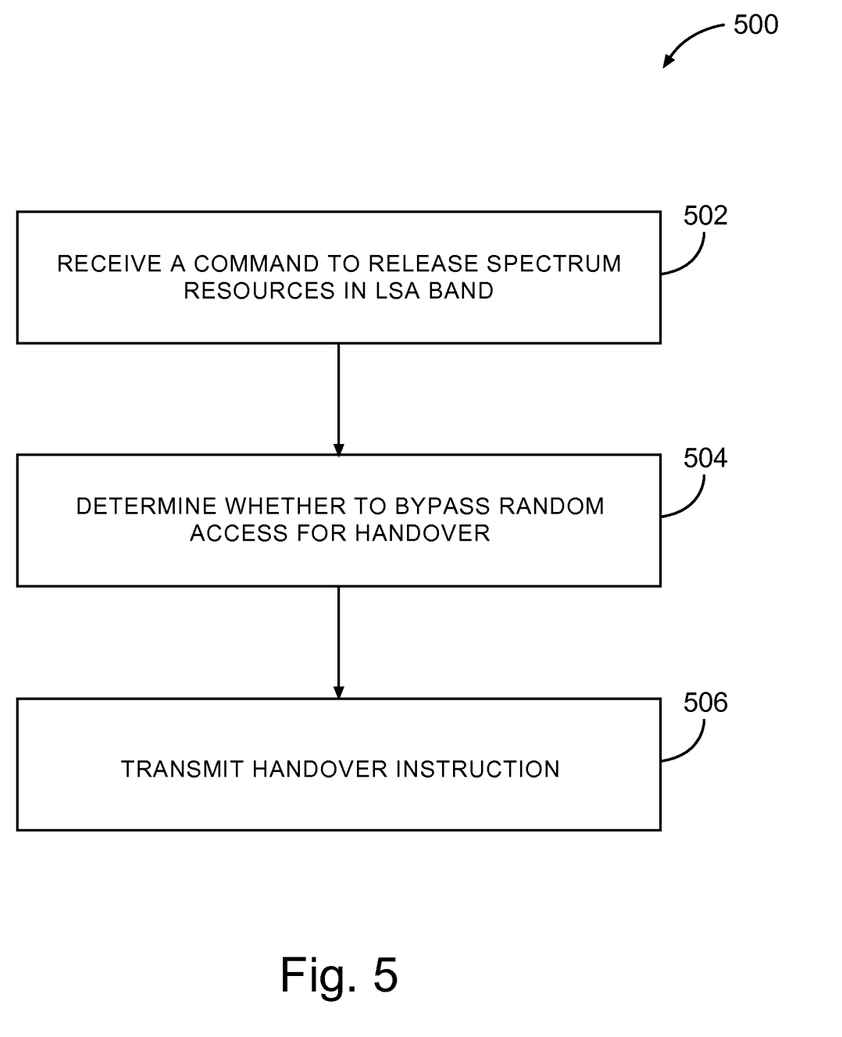
FIG. 5 is a flow chart illustrating a procedure for LSA spectrum release and handover in accordance with some embodiments.

FIG. 5 is a flow chart illustrating of an example procedure 500 for LSA spectrum release and handover in accordance with some embodiments. The procedure 500 can be performed by communication station 400 (FIG. 4), for example when the communication station 400 serves as an eNB 209 (FIG. 2).

In operation 502, the eNB 209 receives a command to release spectrum resources in a LSA band over which the eNB 209 serves an LSA cell. As described earlier herein, this command can be received from an incumbent 201 (FIG. 2) for example. The example procedure 500 continues with operation 504, in which the eNB 209 determines whether UEs 211 served by the eNB 209 are permitted to skip the RAP to be handed over to a target cell operating on a band separate from the LSA band. If the eNB decides the UEs 211 may skip RAP, according to criteria and procedures described earlier herein, the eNB 209 will transmit a message to the UE 211 to instruct the UE 211 that the UE 211 will be handed over to the target cell. The message may include indicators as described earlier herein with regards to the RRCConnectionReconfiguration message and the mobilityControlInfo IE.

Figure 6:
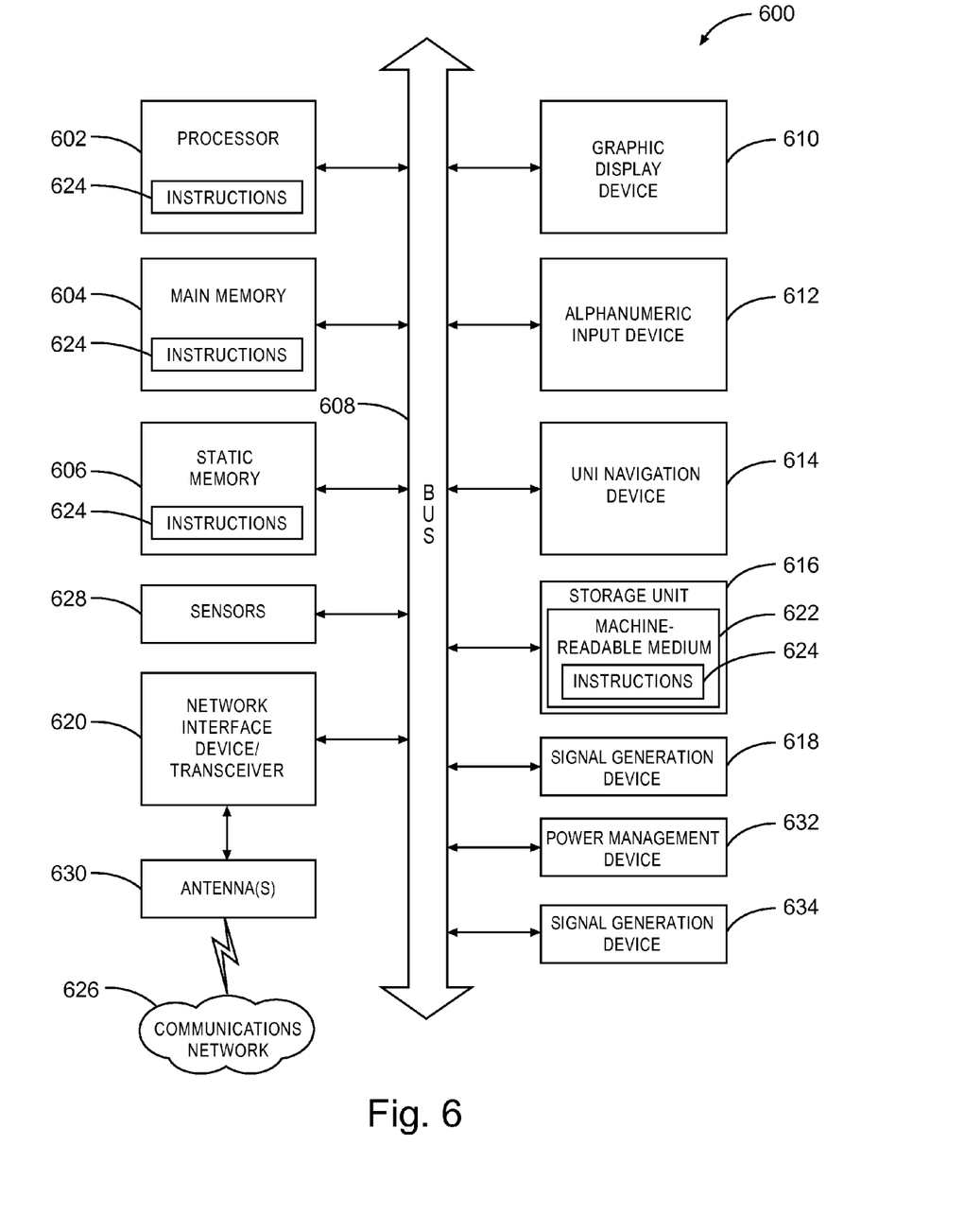
FIG. 6 is a schematic of a machine in accordance with some embodiments.

FIG. 6 illustrates a block diagram of an example of a machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 500 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612 and UI navigation device 614 may be a touch screen display. The machine 600 may additionally include a storage device 616 (i.e., drive unit), a signal generation device 618 (e.g., a speaker), a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions 624 for execution by the machine 600 and that cause the machine 600 to perform any one or more of the techniques of the present disclosure, or that is capable of storing, encoding or carrying data structures used by or associated with instructions 624. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 624 for execution by the machine 600, and includes digital or analog communications signals or other intangible media to facilitate communication of such software.

In one embodiment, a User Equipment (UE) comprises a processor and transceiver configured to receive, on a Licensed Shared Access (LSA) frequency band, a paging message notifying the UE of (LSA) frequency band reclamation, perform immediate cell reselection to vacate the reclaimed LSA frequency band and move to the UE operator's licensed primary Long Term Evolution (LTE) frequency band.

In another embodiment, a non-transitory computer readable storage device includes instructions stored thereon, which when executed by a machine, cause the machine to perform operations to a UE comprises a processor and transceiver configured to receive, on a LSA frequency band, a paging message notifying the UE of (LSA) frequency band reclamation, and perform immediate cell reselection to vacate the reclaimed LSA frequency band and move to the UE operator's licensed primary Long Term Evolution LTE frequency band.

In another embodiment, a UE comprises a processor and transceiver configured to fail to receive, on a LSA frequency band, one or more consecutive paging messages, remain awake for one or more radio frame times, determine that the LSA frequency band has been reclaimed by failing to receive a Master Information Block (MIB) during the one or more radio frame times, and perform immediate cell reselection to vacate the reclaimed LSA frequency band and move to the UE operator's licensed primary LTE frequency band.

In yet another embodiment, an eNB comprises hardware processing circuitry configured to receive a directive to reclaim a LSA frequency band, and transmit, to affected UE, a paging message on the Licensed LSA frequency band notifying the UE of LSA frequency band reclamation.

What is claimed is:
1. An Evolved Node-B (eNB), the eNB comprising hardware processing circuitry configured to:
receive a command to release spectrum resources in a Licensed Shared Access (LSA) band over which the eNB serves an LSA cell;

determine whether user equipment (UEs) served by the eNB are permitted to skip a random access procedure (RAP) to be handed over to a target cell operating on a band separate from the LSA band; and transmit a message to a UE served by the eNB instructing the UE that the UE is to be handed over to the target cell, the message including one or more indicators based on the determination, wherein the message is an RRCConnectionReconfiguration message, and wherein the message includes a mobility control information (IE) with a field indicating that the UE is permitted to skip the RAP to access the target cell if the eNB determined that the UE is permitted to skip the RAP, wherein the mobility control IE further includes a field indicating that the LSA cell and the target cell are co-located in the eNB.

2. The eNB of claim 1, wherein the determination is based on whether the eNB includes the target cell, collocated with the LSA cell, such that frames of the target cell and the LSA cell are synchronized.

3. The eNB of claim 1, wherein the eNB transmits the message using an LSA band resource.

4. The eNB of claim 1, wherein the mobility control IE further includes uplink grant information for uplink resources on a band over which the target cell operates.

5. The eNB of claim 4, wherein the hardware processing circuitry is further configured to receive, from the UE and on uplink resources in accordance with the uplink grant information, a response to the message that indicates that the UE has been successfully handed over to the target cell.

6. The eNB of claim 5, wherein the hardware processing circuitry is configured to:
communicate with the UE over the target cell subsequent to receiving the response indicating that the UE has been successfully handed over to the target cell; and
monitoring the LSA band to determine whether to request resources on the LSA band.

7. The eNB of claim 1, wherein the message is an RRCConnectionReconfiguration message, and wherein the message includes a mobility control information element (IE) with a dedicated preamble for accessing the target cell if the eNB determined that the UE is not permitted to skip the RAP.

8. The eNB of claim 1, wherein the eNB serves the target cell in accordance with a standard of the 3rd Generation Partnership Project (3GPP) Long-Term Evolution (LTE) family of standards.

9. The eNB of claim 1, wherein the hardware processing circuitry is further configured to provide a dedicated preamble for RAP to a subset of UEs served by the eNB.

10. A User Equipment (UE) comprising a processor and transceiver configured to:
receive a message in a Licensed Shared Access (LSA) frequency band instructing the UE to move to a target Long Term Evolution (LTE) frequency band from the LSA frequency band, the message including information indicating that the UE is permitted to skip a random access process (RAP) to access the LTE frequency band, and the message further including uplink grant information, wherein the message is an RRCConnectionReconfiguration message, and wherein the message includes a mobility control information (IE) with a field indicating that the UE is permitted to skip the RAP to access the LTE frequency band, if an Evolved Node-B determined that the UE is permitted to skip the RAP, wherein the mobility control IE further includes a field indicating that the LSA frequency band and the LTE frequency band are provided by two cells co-located in the eNB.

11. The UE of claim 10, wherein the processor and transceiver are further configured to:
skip the RAP responsive to receiving the message including information indicating that the UE is permitted to skip the RAP;
transmit, on an uplink frame in accordance with the uplink grant information, a message to indicate that the UE has successfully initiated transmissions on the LTE frequency if the UE has determined to skip the RAP, and requesting a dedicated preamble for handover otherwise.

12. The UE of claim 10, wherein the UE receives the message from an eNB that includes a first cell operating in the LSA frequency band and a target cell operating in the target LTE band such that frames in the first cell and the target cell are synchronized, and wherein the message is includes a mobility control information (IE) with a field indicating that the UE is permitted to skip the RAP to access the target cell.

13. The UE of claim 10, wherein the UE receives the RRCConnectionReconfiguration message on an LSA band resource, and wherein the UE transmits a confirmation message on an uplink resource provided in the RRCConnectionReconfiguration message.

14. A non-transitory computer-readable storage medium that stores instructions for execution by one or more processors to cause a machine to perform operations including:
receiving an RRCConnectionReconfiguration message in a Licensed Shared Access (LSA) frequency band instructing the machine to move to a target Long Term Evolution (LTE) frequency band from the LSA frequency band, the message including a mobility control information (IE) indicating that the machine is permitted to skip a random access process (RAP) to access the LTE frequency band, and the message further including uplink grant information, and wherein the mobility control IE further includes a field indicating that the LSA frequency band and the LTE frequency band are provided by two cells co-located in the eNB; and
responding to the RRCConnectionReconfiguration with an indication as to whether the machine shall skip RAP.

15. The non-transitory computer-readable storage medium of claim 14, wherein the operations further comprise:
skipping the RAP responsive to receiving the message;
transmitting, on an uplink frame in accordance with the uplink grant information, a message to indicate that the machine has successfully initiated transmissions on the LTE frequency if the machine has determined to skip the RAP, and requesting a dedicated preamble for handover otherwise.

16. The non-transitory computer-readable storage medium of claim 14, wherein the machine receives the RRCConnectionReconfiguration message on an LSA band resource, and wherein the UE transmits a confirmation message on an uplink resource provided in the RRCConnectionReconfiguration message.

17. A non-transitory computer-readable storage medium that stores instructions for execution by one or more processors to cause a machine to perform operations including:
receiving a command to release spectrum resources in a Licensed Shared Access (LSA) band over which the machine serves an LSA cell;

determining whether user equipment (UEs) served by the machine are permitted to skip a random access process (RAP) to be handed over to a target cell operating on a band separate from the LSA band, based on whether the machine includes the target cell, collocated with the LSA cell, such that frames of the target cell and the LSA cell are synchronized; and transmit a message to a UE served by the machine instructing the UE that the UE is to be handed over to the target cell, the message including one or more indicators based on the determination, wherein the message is an RRCConnectionReconfiguration message, and wherein the message includes a mobility control information (IE) with a field indicating that the UE is permitted to skip the RAP to access the target cell if the machine determined that the UE is permitted to skip the RAP, wherein the mobility control IE further includes a field indicating that the LSA cell and the target cell are co-located in the machine.

18. The non-transitory computer-readable medium of claim 17, wherein the message is transmitted using an LSA band resource, and wherein the mobility control IE further including uplink grant information for uplink resources on a band over which the target cell operates.

19. The non-transitory computer-readable medium of claim 17, further comprising instructions to receive, from the UE and on uplink resources in accordance with the uplink grant information, a response to the message that indicates that the UE has been successfully handed over to the target cell.

* * * * *